United States Patent
Xu et al.

(10) Patent No.: US 10,805,398 B2
(45) Date of Patent: Oct. 13, 2020

(54) METHOD FOR CONTROLLING A DOOR VIA INTEGRATED DATA COLLECTION, TRANSMISSION DEVICE AND TRANSMISSION PROCESSING

(71) Applicant: NANJING KANGNI MECHANICAL & ELECTRICAL CO., LTD., Nanjing (CN)

(72) Inventors: Zhixing Xu, Nanjing (CN); Xiaopeng Hou, Nanjing (CN); Aiqing Wang, Nanjing (CN); Xiang Shi, Nanjing (CN)

(73) Assignee: NANJING KANGNI MECHANICAL & ELECTRICAL CO., LTD., Nanjing (CN)

(*) Notice: Subject to any disclaimer, the term of this patent is extended or adjusted under 35 U.S.C. 154(b) by 0 days.

(21) Appl. No.: 16/331,960

(22) PCT Filed: Sep. 22, 2016

(86) PCT No.: PCT/CN2016/099659
§ 371 (c)(1),
(2) Date: Mar. 8, 2019

(87) PCT Pub. No.: WO2018/049695
PCT Pub. Date: Mar. 22, 2018

(65) Prior Publication Data
US 2019/0253498 A1    Aug. 15, 2019

(30) Foreign Application Priority Data
Sep. 14, 2016 (CN) .......................... 2016 1 0825491

(51) Int. Cl.
*H04L 29/08* (2006.01)
*H04L 12/24* (2006.01)
(Continued)

(52) U.S. Cl.
CPC ............ *H04L 67/12* (2013.01); *B60J 5/04* (2013.01); *G05B 19/4183* (2013.01);
(Continued)

(58) Field of Classification Search
CPC combination set(s) only.
See application file for complete search history.

(56) References Cited

U.S. PATENT DOCUMENTS

| 4,675,586 A | * | 6/1987 | Eigner | ................ H02H 7/0851 |
| | | | | 318/286 |
| 5,070,442 A | * | 12/1991 | Syron-Townson | ..... G08B 13/08 |
| | | | | 700/17 |

(Continued)

*Primary Examiner* — Raymond N Phan
(74) *Attorney, Agent, or Firm* — CBM Patent Consulting, LLC (57) ABSTRACT

A door controller with an integrated data collection and transmission device, which comprises a motor driving module, a bus communication module, a vehicle door opening/closing control module, a parameter control module, and a data collection and transmission device. The data collection and transmission device is configured to receive and process four types of data collected by a motor driving data collection unit, a vehicle door opening/closing control data collection unit, an operation parameter collection unit, and a bus communication data collection unit, and transmit the four types of processed data to a background server.

9 Claims, 6 Drawing Sheets

(51) Int. Cl.
  *G05B 19/418* (2006.01)
  *G08C 17/02* (2006.01)
  *H04L 12/40* (2006.01)
  *B60J 5/04* (2006.01)

(52) U.S. Cl.
  CPC ........ *G08C 17/02* (2013.01); *H04L 12/40006* (2013.01); *H04L 41/0631* (2013.01); *H04L 67/025* (2013.01); *H04L 2012/40215* (2013.01); *Y02P 90/02* (2015.11)

(56) References Cited

U.S. PATENT DOCUMENTS

| | | | | |
|---|---|---|---|---|
| 5,625,266 | A * | 4/1997 | Stark | G05B 19/0428 318/466 |
| 8,278,862 | B2 * | 10/2012 | Coleman | H02H 7/0851 318/432 |
| 2008/0186870 | A1 * | 8/2008 | Butts | H04L 41/0659 370/252 |
| 2009/0096622 | A1 * | 4/2009 | Banta | E06B 9/68 340/635 |
| 2013/0201817 | A1 * | 8/2013 | Jiang | H04L 41/0659 370/217 |
| 2017/0310261 | A1 * | 10/2017 | Goetzelmann | H02P 23/0031 |
| 2018/0370459 | A1 * | 12/2018 | Kwak | B60R 16/0234 |

* cited by examiner

METHOD FOR CONTROLLING A DOOR VIA INTEGRATED DATA COLLECTION, TRANSMISSION DEVICE AND TRANSMISSION PROCESSING

TECHNICAL FIELD

The present invention relates to a door controller, and more particularly, to a door controller with an integrated data collection and transmission device and a transmission processing method thereof.

BACKGROUND

A rail transit train is composed of multiple vehicles, each of which has several vehicle doors on its two sides, and the opening and closing of each vehicle door is controlled by a door controller inside a system. A rail vehicle door system is listed as an A-class key core component of a rail transit vehicle and is also a vehicle equipment most used. In an operation process, the vehicle door system needs to be opened and closed frequently, which results in frequent vehicle door faults of a passenger compartment in combination with the impact of large passenger flow. According to statistics, vehicle door faults account for more than 30% of vehicle operation faults, seriously affecting the normal operation of vehicles. However, the most important component in the process of opening and closing the vehicle door of the rail vehicle is the door controller, and a working state of the door controller can also indirectly reflect an overall working state of the vehicle door. Therefore, the monitoring of key parameters of the door controller can directly or indirectly monitor the working state of the vehicle door. The door controller is a data source for judging an operation state of the rail vehicle door.

However, the existing door controller can detect the occurrence of a fault when the rail vehicle door fails, but cannot notify maintenance personnel in real time, cannot record the real-time operation state of a vehicle door motor and the like when the fault occurs, and cannot judge a sub-health state of the vehicle door system.

At present, there are also some detection methods for the door controller, i.e., RS232 or RS485 buses are used to externally connect detection equipment to an external interface of the door controller for detection, the defect thereof is that the external equipment has a complex circuit and takes up a space, which is not conducive to system integration; and the detection equipment is connected between the door controller and the motor, the data capable of being detected is limited to the communication information between the door controller and the vehicle bus, and the driving information of the motor, the door opening/closing control information and the internal operation state parameters of the door controller cannot be collected. However, the information is very important for the detection and judgment of faults, and without the information, not only the information of fault judgment is incomplete, but also the functions of real-time detection and early warning of faults cannot be realized.

SUMMARY

Object of the present invention: aiming at the defects of the prior art, the present invention is intended to provide a door controller with an integrated data collection and transmission device and a transmission processing method thereof.

Technical solutions: a door controller with an integrated data collection and transmission device comprises:

a motor driving module, configured to drive a motor to operate, and internally provided with a motor driving data collection unit for collecting a motor driving signal in real time;

a bus communication module, configured to communicate with a vehicle bus, and internally provided with a bus communication data collection unit for collecting communication information between the door controller and the vehicle bus;

a vehicle door opening/closing control module, configured to control vehicle door opening/closing, and internally provided with a vehicle door opening/closing control data collection unit for collecting an opening/closing signal of a vehicle door system;

a parameter control module, configured to record operation parameters of the door controller, and internally provided with an operation parameter collection unit for collecting operation state parameters inside the door controller; and a data collection and transmission device configured to receive and process four types of data collected by the motor driving data collection unit, the vehicle door opening/closing control data collection unit, the operation parameter collection unit and the bus communication data collection unit, and transmit the four types of processed data to a background server.

Further, the data collection and transmission device is integrated with the door controller and communicates with the door controller through a serial port inside the door controller, and the serial port comprises a CAN port and an SPI port.

Further, the data collection and transmission device receives a motor driving signal collected by the motor driving data collection unit in real time and performs calculation processing and analysis to obtain motor parameters; and the motor parameters comprise rotation angle, rotation speed, torque, and door opening/closing time.

Further, when a vehicle door fails, the data collection and transmission device receives communication information between the door controller and the vehicle bus collected by the bus communication data collection unit, and performs calculation processing and analysis to obtain fault parameters of the vehicle door.

Further, the data collection and transmission device is internally provided with a communication module configured to transmit the processed four types of data to the background server, and the communication module comprises a wireless communication module and a wired communication module.

Further, the wireless communication module comprises one or more of WIFI, 3G, Zigbee and 470 MHz wireless modules, and the wired communication module comprises an Ethernet module and/or a CAN module.

Further, a plurality of data collection and transmission devices of each carriage perform chain networking communication through the wired communication module.

Further, the data collection and transmission device comprises a storage module, the storage module comprises a first buffer and a second buffer, the first buffer is configured to store originally collected data received by the data collection and transmission device, and the second buffer is configured to store effective data after judging the originally collected data.

A data transmission processing method of a door controller with an integrated data collection and transmission device comprises the following steps:

(1) receiving, by a data collection and transmission device, data collected by a motor driving data collection unit, a vehicle door opening/closing control data collection unit, an operation parameter collection unit and a bus communication data collection unit, and storing the data in a first buffer;

(2) judging whether the collected data is valid data through data verification, and storing the data in a second buffer if the collected data is valid data; otherwise, wiping the data;

(3) classifying the data stored in the second buffer, and judging whether the data belongs to a real-time motor driving signal, communication information between the door controller and a vehicle bus, an opening/closing signal of a vehicle door system, or operation state parameters inside the door controller;

(4) processing or storing the data classified in step (3): processing the real-time motor driving signal to obtain and store real-time motor parameters; processing the communication information between the door controller and the vehicle bus to obtain and store fault parameters of the vehicle door when the fault occurs; processing the opening/closing signal of the vehicle door system to obtain and store a change amount of a vehicle door opening/closing state; and storing operation state parameters inside the door controller, wherein the data is stored in the second buffer in the embodiment, and other storage methods can be also adopted; and (5) transmitting the data stored in step (4) to a background server through a communication module.

Beneficial effects: by integrating the data collection and transmission device inside the door controller, the present invention can communicates with the door controller through the serial port inside the door controller, and collects the real-time motor driving signal in the door controller, the communication information between the door controller and the vehicle bus, the opening/closing signal of the vehicle door system and the operation state parameters inside the door controller, by processing and transmitting the parameters to the server, the fault causes can be ascertained as soon as possible when the faults occur, and when no faults occur, the present invention monitors whether each parameter is normal in real time and records so as to create a database. Analysis is performed according to changes in each parameter, such that warnings can be provided for situations in which faults may occur, the recorded database and parameter change trend can make great contribution to future fault research and automatic fault processing, or giving of processing strategy, and are of great significance to vehicle operation fault detection and maintenance.

BRIEF DESCRIPTION OF THE DRAWINGS

FIG. 6 is an overall framework diagram of a background server.

DETAILED DESCRIPTION

The technical solutions will be described in detail hereinafter with reference to the embodiments and drawings.

Figure 1:
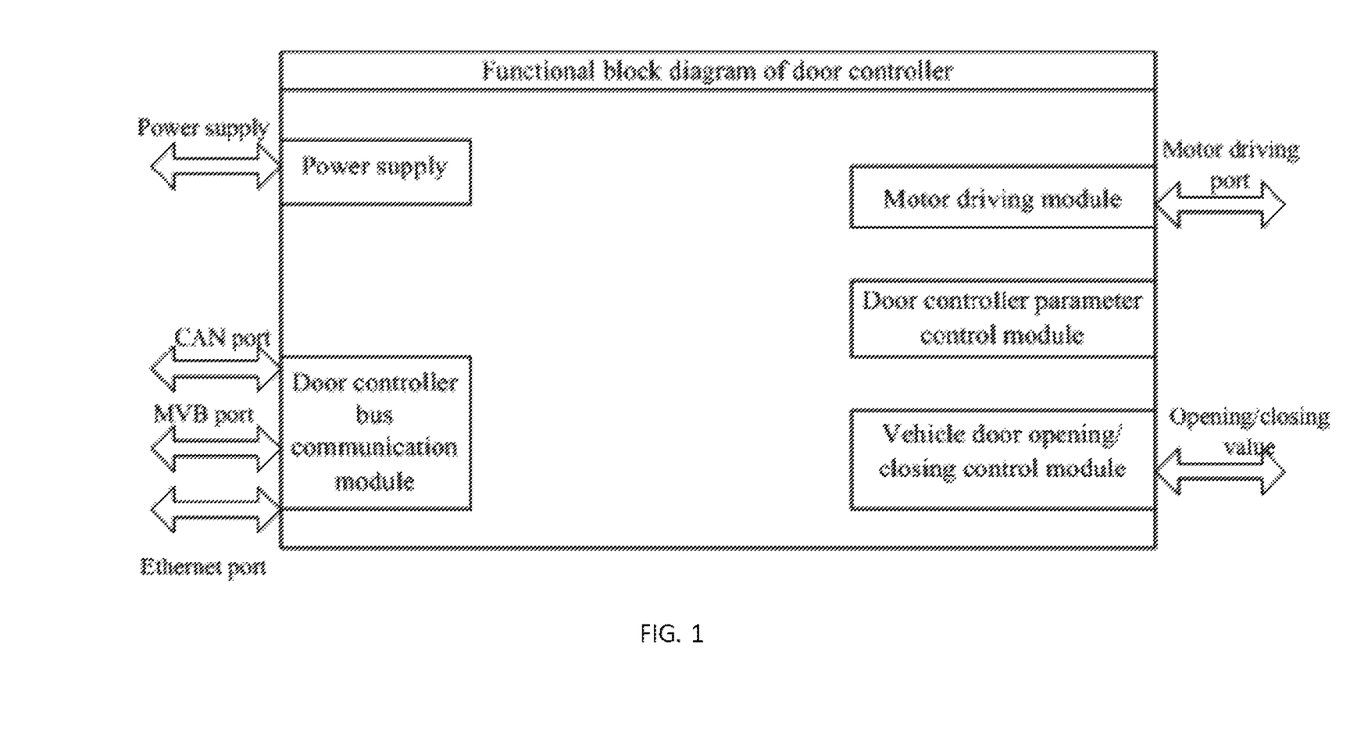
FIG. 1 is a structure diagram of an original functional module of a door controller.
Figure 2:
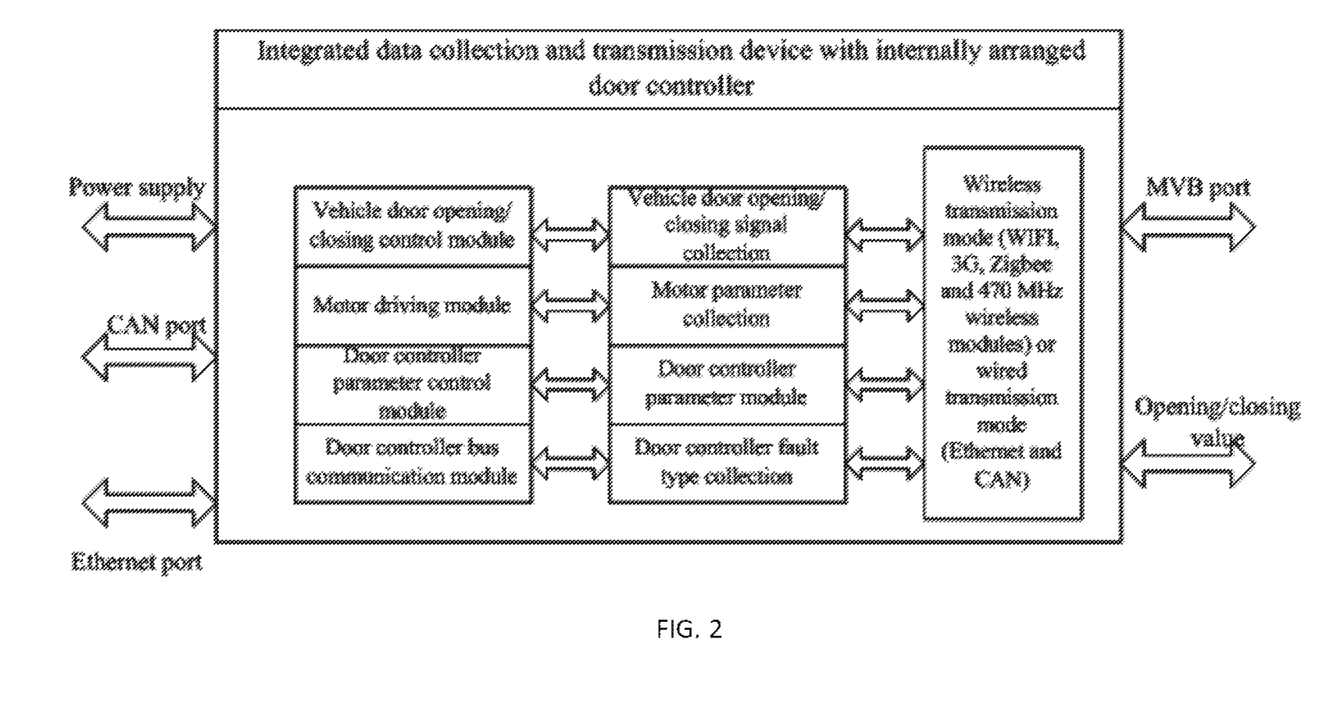
FIG. 2 is a structure diagram of the present invention.

As shown in FIG. 1, a door controller with an integrated data collection and transmission device comprises a motor driving module, a bus communication module, a vehicle door opening/closing control module and a parameter control module, and further comprises a data collection and transmission device, as shown in FIG. 2. The data collection and transmission device is integrated with the door controller and communicates with the door controller through a serial port inside the door controller, and the serial port comprises a CAN port and an SPI port. According to the present invention, a board card of the data collection and transmission device is embedded inside the door controller and structurally integrated with the original door controller, without changing the installation structure and mode of the door controller and the function of the original door controller, so that the original door controller can be completely replaced.

Figure 3:
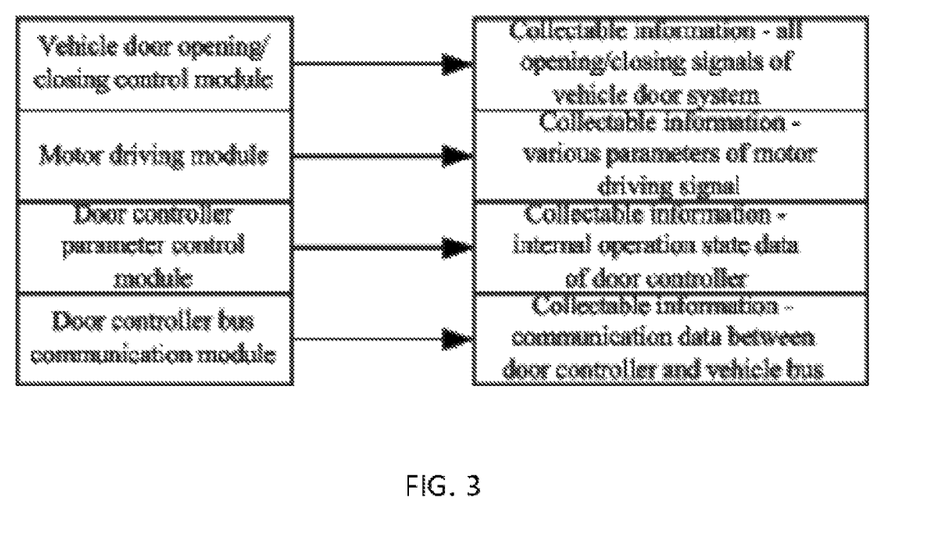
FIG. 3 is a diagram of information that can be collected by each functional module of the door controller.

As shown in FIG. 3, the motor driving module is configured to drive a motor to operate and internally provided with a motor driving data collection unit for collecting a motor driving signal in real time; the data collection and transmission device receives a motor driving signal collected by the motor driving data collection unit in real time and performs calculation processing and analysis to obtain motor parameters; and the motor parameters comprise rotation angle, rotation speed, torque, and door opening/closing time.

The bus communication module is configured to communicate with a vehicle bus and internally provided with a bus communication data collection unit for collecting communication information between the door controller and the vehicle bus; and when a vehicle door fails, the data collection and transmission device receives communication information between the door controller and the vehicle bus collected by the bus communication data collection unit, and performs calculation processing and analysis to obtain fault parameters of the vehicle door.

The vehicle door opening/closing control module is configured to control vehicle door opening/closing and internally provided with a vehicle door opening/closing control data collection unit, which can collect an opening/closing signal of a vehicle door system.

The parameter control module is configured to record operation parameters of the door controller and internally provided with an operation parameter collection unit for collecting operation state parameters inside the door controller.

The data collection and transmission device is configured to receive and process four types of data collected by the motor driving data collection unit, the vehicle door opening/closing control data collection unit, the operation parameter collection unit and the bus communication data collection unit, and transmit the four types of processed data to a background server. Through performing internal calculation processing and analysis on the real-time original operation data of the vehicle door collected, the data collection and transmission device can monitor the real-time operation state of the vehicle door, and judge the sub-health state or the type of operation fault of the vehicle door, so as to achieve the purpose of monitoring the operation state of the rail vehicle door in real time; and the fault can be preliminarily judged, i.e. the judgment can be made in time when the vehicle door is under the sub-health state and other states.

The data collection and transmission device comprises a communication module, a storage module and an MCU module configured to process data, the storage module comprises a first buffer and a second buffer, the first buffer is configured to store originally collected data received by the data collection and transmission device, and the second buffer is configured to store the valid data after judging the originally collected data.

The communication module is configured to transmit the processed four types of data to the background server, and the communication module comprises a wireless communication module and a wired communication module.

Figure 4:
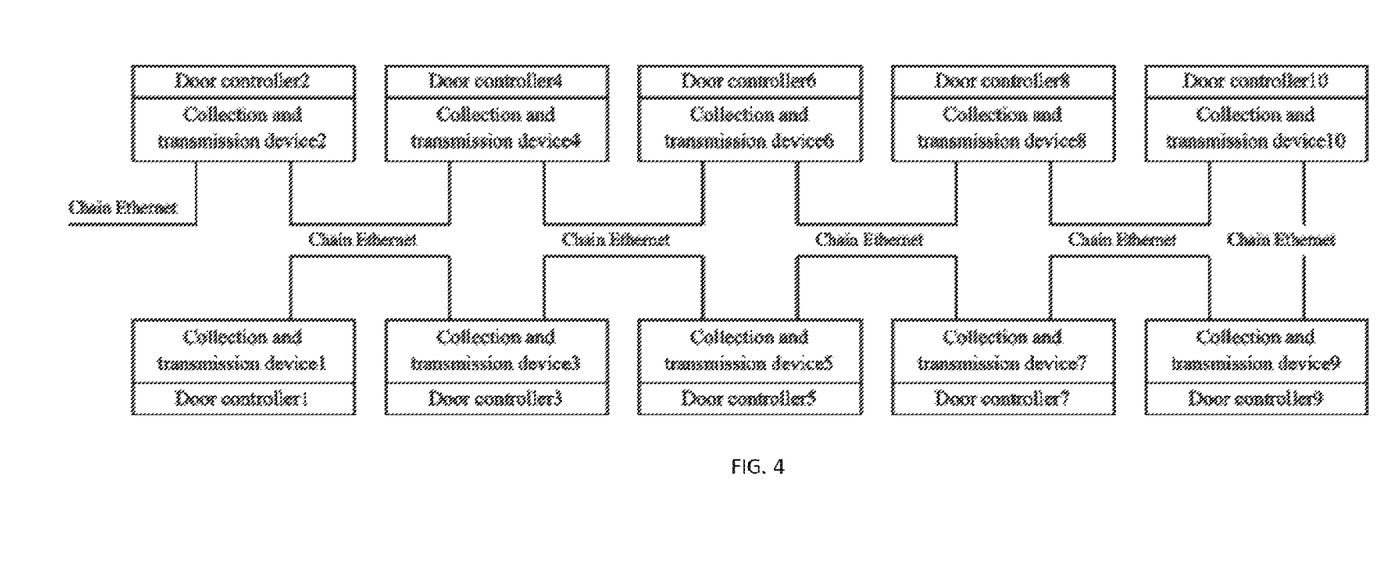
FIG. 4 is a structure diagram of a chain network of each carriage.

The wireless communication module comprises one or more of WIFI, 3G, Zigbee and 470 MHz wireless modules on the board card, and the wired communication module comprises an Ethernet module and/or a CAN module. When the wired communication module is used, a plurality of data collection and transmission devices of each carriage perform chain networking communication through the wired communication module. As shown in FIG. 4, the Ethernet module is used for chain Ethernet networking communication, each data collection and transmission device comprises two Ethernet ports, the chain networking is used in 10 data collection and transmission devices of each carriage, through end-to-end connection by the chain Ethernet, the first collection and transmission device is connected to a switch, and the operation data of all doors on a train are transmitted to the background server through the Ethernet. The networking mode is simple in circuit, and all the door controllers of each carriage only occupy one Ethernet port of the switch, so that only one switch can be used for communication of all door controllers in the whole train. If CAN communication is used, the chain Ethernet in the drawing will be changed to CAN communication, and the chain networking mode will remain unchanged.

Figure 5:
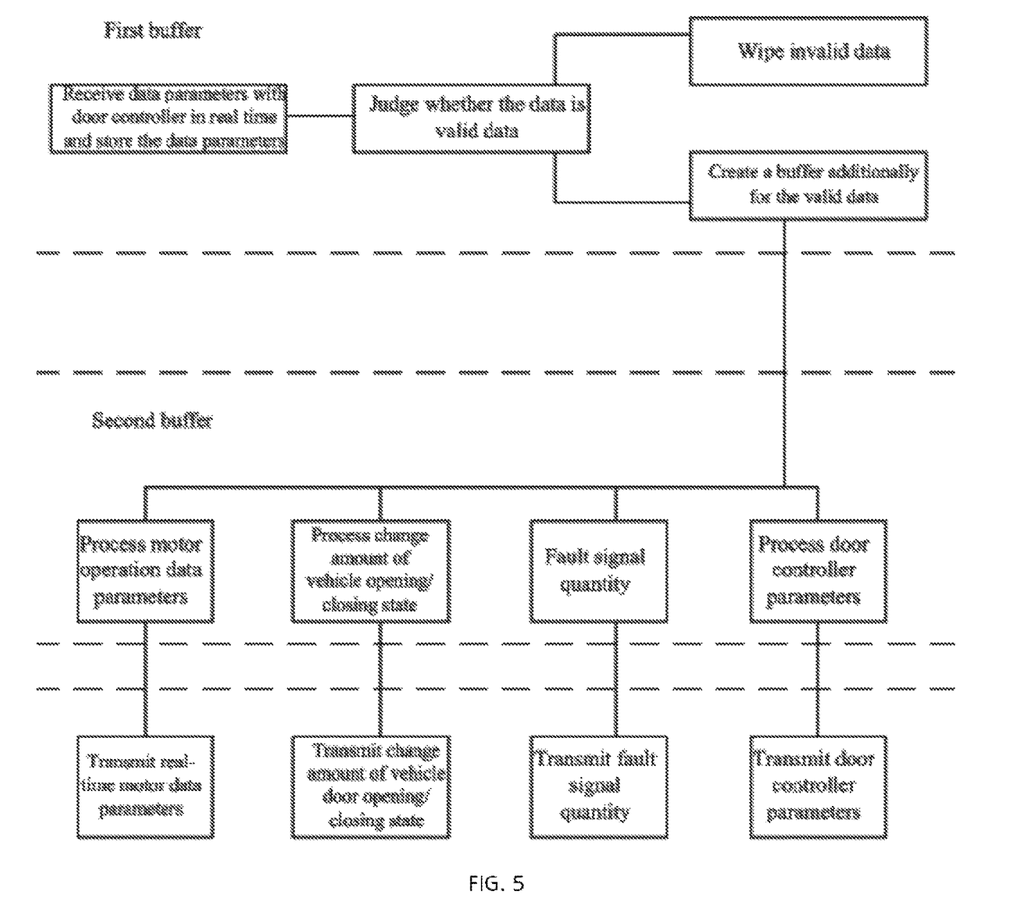
FIG. 5 is a flow chart of a data transmission processing method of the door controller with an integrated data collection and transmission device.

FIG. 5 shows a data transmission processing method of a door controller with an integrated data collection and transmission device, wherein a data collection and transmission device is firstly ensured to communicate with the door controller normally, receives correct data, then classifies and analyzes the data, and finally transmits the data to the background server. The method specifically comprises the following steps:

(1) receiving, by the data collection and transmission device, data collected by a motor driving data collection unit, a vehicle door opening/closing control data collection unit, a door controller operation state parameter collection unit and a bus communication data collection unit, and storing the data in a first buffer; wherein the collected original data comprises rotation angle, rotation speed and current of the door motor, IO signals of the vehicle door system, fault codes of the vehicle door, operation state parameters of the door controller, etc.;

(2) judging whether the collected data is valid data through data verification, and storing the data in a second buffer if the collected data is valid data; otherwise, wiping the data;

(3) classifying the data stored in the second buffer, and judging whether the data belongs to a real-time motor driving signal, communication information between the door controller and a vehicle bus, an opening/closing signal of a vehicle door system, or operation state parameters inside the door controller;

(4) processing or storing the data classified in step (3): processing the real-time motor driving signal to obtain and store real-time motor parameters; processing the communication information between the door controller and the vehicle bus to obtain and store fault parameters of the vehicle door when the fault occurs, comprising rotation angle, rotation speed, torque, temperature, door opening/closing time, etc.; processing the opening/closing signal of the vehicle door system to obtain and store a change amount of a vehicle door opening/closing state; and storing operation state parameters inside the door controller; and (5) transmitting the data stored in step (4) to a background server through a communication module.

FIG. 6 is an overall framework diagram of a background server, the door controller with an integrated data collection and transmission device transmits the door operation data to the background server through the communication module for storage and analysis, and the user can access the background server through the communication module at a client. In this way, the customer can know whether the transmission equipment runs normally at each branch, can input such data as maintenance data feedback, daily inspection and weekly inspection of database inspection personnel, can analyze and diagnose fault data of the door system online, and downloads diagnostic standard or expert experience suitable for the same application scenario to the door controller.

The background server of the present invention mainly receives the working state data of the door system of all train doors installed with on-board monitoring equipment, performs diagnostic analysis on the data, stores the operation state data of all vehicle doors and the diagnosed fault data, and provides a visual interface for inquiring statistical reports of historical data and door data, and the like. The following main functions are specifically realized.

(1) Real-time communication service (including redirection service) function: obtaining the door system data of all train doors installed with the equipment;

(2) Data processing function: processing the internal data conversion and data processing of the entire data center, and comprising fault data analysis and diagnosis of the door system, on-line monitoring and display, data security processing, knowledge base calculation and maintenance, database operation, and other functions;

(3) Web application service: mainly providing Web application service for the entire data center, so that the user can access data in the data center through a browser without installing a special client on a computer;

(4) File service: mainly supporting data file management (database backup, upgrade file management, etc.), download and upgrade of remote device version, change in device configuration item, etc.;

(5) Database and expert knowledge vase: the database of data center being generally divided into a basic database, a real-time database, a business database, a log database, etc.; and (6) Mobile application function: supporting mobile APP, mobile background service processing service, and online collaborative processing of mobile APP of the fault, realizing remote diagnosis mobility, operating and maintaining mobile office.

The present invention has the advantages as follows.

(1) Once a fault occurs, the complete information of the fault process can be automatically recorded, so as to analyze the fault cause afterwards and avoid similar accident from happening again. The performance of the vehicle door system can be fully understood, and strong evidence for improving the design, manufacturing and maintenance level is provided.

(2) By analyzing the abnormal operation state of the door system, the cause, degree and position of the fault are revealed, which provides scientific basis for the maintenance and repair of the door system, prolongs the service life, reduces the maintenance cost, reduces the operation and maintenance cost, and makes technical preparation for realizing the on-line monitoring and condition maintenance of the door system.

(3) The early sign of the fault is found in time, so as to take corresponding measures to avoid, slow down and reduce the occurrence of major accidents, improve the operation reliability and safety of subway door system, reduce the amount of vehicle door faults and improve the operation order.

(4) The big data analysis and network intelligent operation and maintenance system realize multi-level cooperative management among the designer, tester, inspector, on-site installation and debugging personnel, after-sales maintenance personnel and operation and maintenance personnel.

The information collected by the present invention can utilize Internet of Things and big data analysis technology to realize remote online monitoring of the working state of the rail door system; record the complete information of the fault occurrence process of the door system, and assist in in-depth analysis of the fault cause; predict the sub-health state of the door system; and push the vehicle door repair mode to be converted to state repair from fault repair and plan repair step by step.

The foregoing are the preferred embodiments of the present invention, and it should be noted that those of ordinary skills in the art may further make a plurality of improvements and decorations without departing from the principle of the present invention, and these improvements and decorations shall all fall within the protection scope of the present invention.

What is claimed is:

1. A door controller with an integrated data collection and transmission device, comprising:
    a motor driving module, configured to drive a motor to operate, and internally provided with a motor driving data collection unit for collecting a motor driving signal in real time; the motor driving signal comprising a rotation angle, a speed, a torque, a temperature and a door opening/closing time;
    a bus communication module, configured to communicate with a vehicle bus, and internally provided with a bus communication data collection unit for collecting communication information between the door controller and the vehicle bus;
    a vehicle door opening/closing control module, configured to control vehicle door opening/closing, and internally provided with a vehicle door opening/closing control data collection unit for collecting an opening/closing signal of a vehicle door system;
    a parameter control module, configured to record operation parameters of the door controller, and internally provided with an operation parameter collection unit for collecting operation state parameters inside the door controller; and
    a data collection and transmission device configured to receive and process four types of data collected by the motor driving data collection unit, the vehicle door opening/closing control data collection unit, the operation parameter collection unit and the bus communication data collection unit; stores the four types of data in a first buffer; then stores the four types of data in a second buffer after validation; and process the four types of data in the second buffer that is transmitted to a background server.

2. The door controller with an integrated data collection and transmission device according to claim 1, wherein the data collection and transmission device is integrated with the door controller and communicates with the door controller through a serial port inside the door controller, and the serial port comprises a CAN port and an SPI port.

3. The door controller with an integrated data collection and transmission device according to claim 1, wherein the data collection and transmission device receives a motor driving signal collected by the motor driving data collection unit in real time and performs calculation processing and analysis to obtain motor parameters; and the motor parameters comprise rotation angle, rotation speed, torque, and door opening/closing time.

4. The door controller with an integrated data collection and transmission device according to claim 1, wherein when a vehicle door fails, the data collection and transmission device receives communication information between the door controller and the vehicle bus collected by the bus communication data collection unit, and performs calculation processing and analysis to obtain fault parameters of the vehicle door.

5. The door controller with an integrated data collection and transmission device according to claim 1, wherein the data collection and transmission device is internally provided with a communication module configured to transmit the processed four types of data to the background server, and the communication module comprises a wireless communication module and a wired communication module.

6. The door controller with an integrated data collection and transmission device according to claim 5, wherein the wireless communication module comprises one or more of WIFI, 3G, Zigbee and 470 MHz wireless modules, and the wired communication module comprises an Ethernet module and/or a CAN module.

7. The door controller with an integrated data collection and transmission device according to claim 1, wherein the data collection and transmission device comprises a storage module, the storage module comprises a first buffer and a second buffer, the first buffer is configured to store originally collected data received by the data collection and transmission device, and the second buffer is configured to store effective data after judging the originally collected data.

8. The door controller with an integrated data collection and transmission device according to claim 5, wherein a plurality of data collection and transmission devices of each carriage perform chain networking communication through the wired communication module.

9. A data transmission processing method of a door controller with an integrated data collection and transmission device, comprising the following steps:
    (1) receiving, by a data collection and transmission device, data collected by a motor driving data collection unit, a vehicle door opening/closing control data collection unit, an operation parameter collection unit and a bus communication data collection unit, and storing the data in a first buffer;
    (2) judging whether the collected data is valid data through data verification, and storing the data in a second buffer if the collected data is valid data; otherwise, wiping the data;
    (3) classifying the data stored in the second buffer, and judging whether the data belongs to a real-time motor driving signal, communication information between the door controller and a vehicle bus, an opening/closing signal of a vehicle door system, or operation state parameters inside the door controller;

(4) processing or storing the data classified in step (3): processing the real-time motor driving signal to obtain and store real-time motor parameters; processing the communication information between the door controller and the vehicle bus to obtain and store fault parameters of the vehicle door when the fault occurs; processing the opening/closing signal of the vehicle door system to obtain and store a change amount of a vehicle door opening/closing state; and storing operation state parameters inside the door controller, wherein the data is stored in the second buffer in the embodiment, and other storage methods can be also adopted; and (5) transmitting the data stored in step (4) to a background server through a communication module.

\* \* \* \* \*